(No Model.)
C. D. CHASE.
APPARATUS FOR EXTRACTING GLUTEN FROM THE WASTE WATER OF STARCH WORKS.
No. 289,979. Patented Dec. 11, 1883.
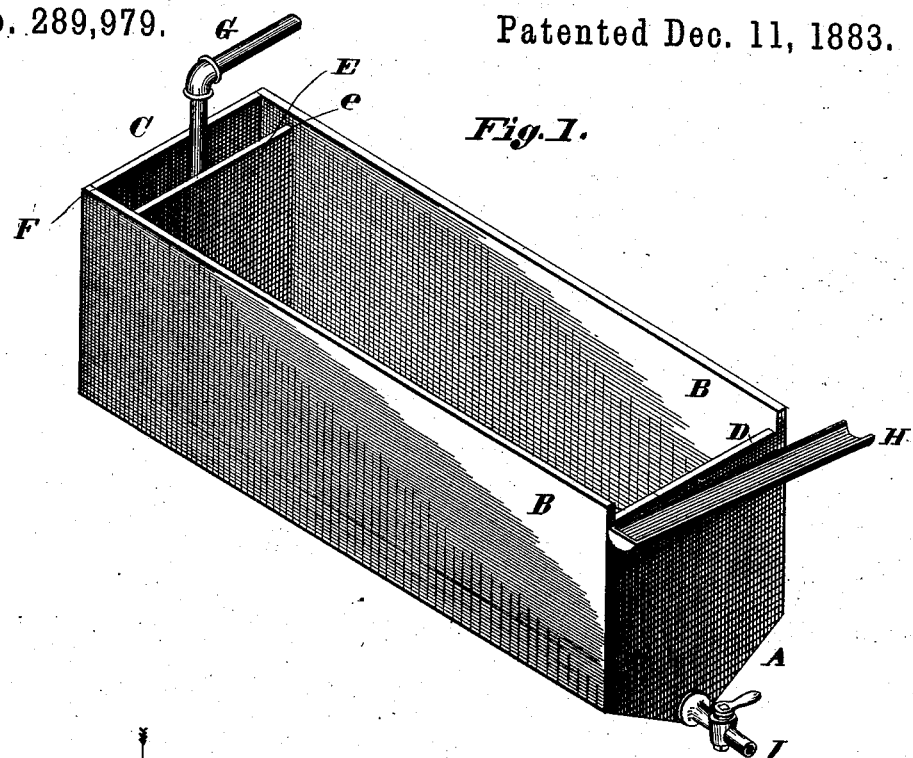
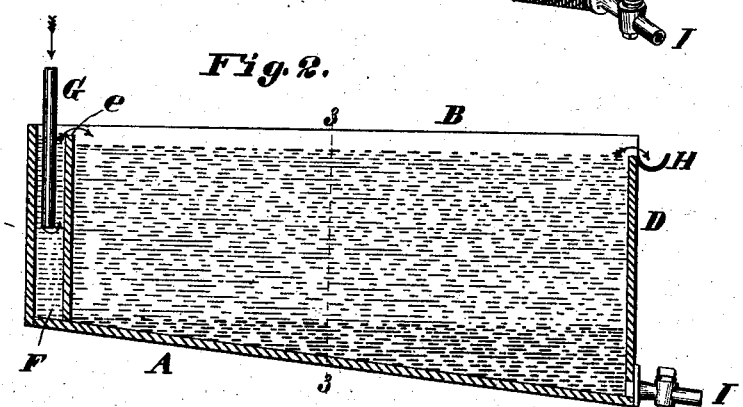
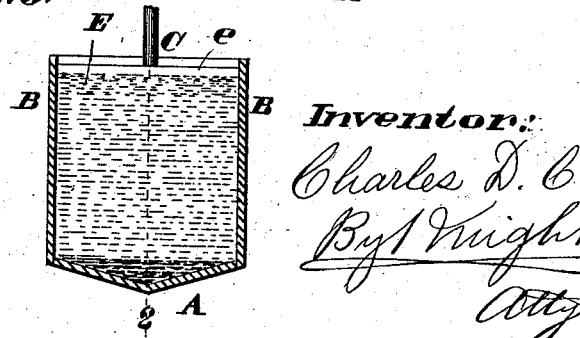
Attest:
Charles Pickles
Wm. F. Sayers
Inventor:
Charles D. Chase
By Knight Bro.
Attys.

United States Patent Office.

CHARLES D. CHASE, OF ST. LOUIS, MISSOURI.

APPARATUS FOR EXTRACTING GLUTEN FROM THE WASTE WATER OF STARCH-WORKS.

SPECIFICATION forming part of Letters Patent No. 289,979, dated December 11, 1883.

Application filed September 8, 1882. (No model.)

*To all whom it may concern:*

Be it known that I, CHARLES D. CHASE, of the city of St. Louis, in the State of Missouri, have invented a certain new and useful Apparatus for Extracting Gluten from the Waste Water of Starch-Works, of which the following is a full, clear, and exact description, reference being had to the accompanying drawings, forming part of this specification.

My invention consists of a settling-tank of novel construction with the attachments for the introduction of the liquid to be treated and the separate discharge of the waste water and the gluten solution, the liquid to be treated overflowing from its receptacle into the settling-tank, whose overflow is but a little lower, if any, than the overflow at its receiving end. The liquid under treatment thus flows in an even and quiet sheet into the settling-chamber, where the gluten solution settles in a somewhat thick fluid, which is drawn off from the bottom in this fluid state, the water from which the gluten has settled running to waste.

Figure 1 is a perspective view of my apparatus. Fig. 2 is a longitudinal section at 2 2, Fig. 3. Fig. 3 is a transverse section at 3 3, Fig. 2.

I show the bottom of the tank inclined downward to the discharging end and sloping downward from the sides to the middle; but this construction is not essential, for the thick glutinous material will settle and fill the whole lower portion of the tank, and the bottom may be made flat and level, and the said material be drawn off at either end or side or by a suction-pump or siphon extending from above.

The tank, as shown, has bottom A, sides B, and ends C D.

E is a partition extending across the tank near the end C, and tightly connected to the sides and bottom, forming a tight receiving-chamber, F, at one end of the tank. The upper edge, e, of the partition is horizontal and somewhat lower than the top of end C and the sides, so that a thin sheet of liquid will flow over the top of the partition from side to side of the tank. The waste liquid from the starch-settling apparatus enters the lower part of the receiving-chamber F through a feed-pipe, G, said pipe descending so low that the surface of the liquid in chamber F will not be injuriously agitated by the liquid entering through the pipe G.

The upper edge of the end D is somewhat lower than the top of the partition. Said edge is necessarily lower than the sides and end C, so that the waste water will overflow above the end D.

H is a trough carrying off the waste water from the tank. The gluten solution settles to the bottom of the tank, and may be drawn off through a cock, I, or it may be drawn off by a suction-pipe or the short leg of a siphon descending from above to near the bottom of the tank. The contents of the tank are scarcely agitated by the thin sheet of water entering it over the partition E, and said contents move slowly toward the end D, depositing the gluten in the lower part of the tank while the water flows over the end D into the trough H and is carried away.

I claim—

1. An apparatus for extracting gluten from waste water of starch-works, which consists in a tank having a receptacle at one end for the liquid to be treated, a partition over which the liquid flows, a settling-chamber having an overflow about the same height as the overflow from the receptacle, to permit the liquid to pass in a quiet sheet over the settling-tank, and means for entering the liquid near the bottom of the receptacle, as set forth.

2. A settling-tank having a receptacle, F, overflow-partition E, and overflow from the settling-chamber a little lower than the overflow-partition, to permit the liquid to pass over the settling-chamber in a quiet sheet, as set forth.

3. A settling-tank having receptacle F, overflow-partition E, and overflow end a little lower than the overflow-partition, in combination with a feed-pipe, G, descending into the receptacle, as set forth.

4. A settling-tank having bottom A, sides B, and end C of same height, partition E, having its top e a little lower than the sides, end D a little lower than the partition, inlet-pipe G, trough H, and cock I, as set forth.

Witness my hand this 5th day of September, 1882.

CHARLES D. CHASE.

Witnesses:
SAML. KNIGHT,
GEO. H. KNIGHT.